US008105406B2

(12) United States Patent
Nishizawa et al.

(10) Patent No.: US 8,105,406 B2
(45) Date of Patent: Jan. 31, 2012

(54) AIR CLEANER FOR VEHICLE AND MOTORCYCLE EQUIPPED WITH THE SAME

(75) Inventors: Kazuya Nishizawa, Iwata (JP); Satoshi Terumichi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 642 days.

(21) Appl. No.: 12/244,328

(22) Filed: Oct. 2, 2008

(65) Prior Publication Data
US 2009/0090090 A1 Apr. 9, 2009

(30) Foreign Application Priority Data
Oct. 3, 2007 (JP) ................................. 2007-259647

(51) Int. Cl.
*B01D 50/00* (2006.01)
(52) U.S. Cl. ............. 55/385.3; 55/290; 55/482; 55/485; 55/503; 55/486; 180/68.3; 180/219; 123/198 E
(58) Field of Classification Search .................. 55/385.3, 55/290, 482, 485, 503, 486; 180/68.3, 219; 123/198 E
See application file for complete search history.

(56) References Cited

U.S. PATENT DOCUMENTS

| 4,402,379 | A | * | 9/1983 | Hoshi | 180/225 |
| 4,484,651 | A | * | 11/1984 | Hattori et al. | 180/225 |
| 4,509,613 | A | * | 4/1985 | Yamaguchi | 180/219 |
| 4,648,474 | A | * | 3/1987 | Shinozaki et al. | 180/219 |
| 4,799,569 | A | | 1/1989 | Hattori | |
| 5,350,444 | A | * | 9/1994 | Gould et al. | 96/154 |
| 6,736,871 | B1 | * | 5/2004 | Green et al. | 55/385.3 |
| 6,840,973 | B2 | * | 1/2005 | Kuji et al. | 55/385.3 |
| 7,270,207 | B2 | * | 9/2007 | Idei et al. | 180/68.3 |
| 7,299,889 | B2 | * | 11/2007 | Yokomizo | 180/219 |
| 7,637,974 | B2 | * | 12/2009 | Scholl et al. | 55/340 |
| 7,766,119 | B2 | * | 8/2010 | Yokoi et al. | 180/311 |
| 7,867,311 | B1 | * | 1/2011 | Connor et al. | 55/482 |
| 2004/0187453 | A1 | * | 9/2004 | Kuji et al. | 55/385.3 |
| 2005/0217632 | A1 | * | 10/2005 | Imanishi et al. | 123/198 E |

(Continued)

FOREIGN PATENT DOCUMENTS

DE 10347103 A1 6/2005
(Continued)

OTHER PUBLICATIONS

European Search Report, Nov. 23, 2009, pp. 1-5.
(Continued)

*Primary Examiner* — Jason M Greene
*Assistant Examiner* — Dung H Bui
(74) *Attorney, Agent, or Firm* — Keating & Bennett, LLP

(57) ABSTRACT

An air cleaner 10 includes an air cleaner case 3 having an inlet 1 for introducing air and an outlet 2 for ejecting air. An intake pipe 5 having an intake opening 4 opened upward or obliquely upward in the air cleaner case 3 is connected to the outlet 2. The air cleaner 10 includes a main air filter element 6a positioned above the intake opening 4 and an auxiliary air filter element 6b, which is separate from the main air filter element 6a, positioned above the intake opening 4 but below the main air filter element 6a. The main air filter element 6a is configured to be detachable from the air cleaner case 3 with the auxiliary air filter element 6b fixed in the air cleaner case 3.

18 Claims, 9 Drawing Sheets

U.S. PATENT DOCUMENTS

| | | | |
|---|---|---|---|
| 2005/0241610 A1* | 11/2005 | Takano et al. | 123/198 E |
| 2006/0065457 A1* | 3/2006 | Miyabe et al. | 180/219 |
| 2007/0131194 A1* | 6/2007 | Moser et al. | 123/198 E |
| 2007/0251200 A1* | 11/2007 | Volo et al. | 55/482 |
| 2008/0070022 A1* | 3/2008 | Umezu et al. | 428/220 |
| 2008/0110098 A1* | 5/2008 | Frederick | 49/463 |
| 2008/0184893 A1* | 8/2008 | Oh et al. | 96/416 |
| 2009/0090576 A1* | 4/2009 | Nishizawa et al. | 180/219 |

FOREIGN PATENT DOCUMENTS

| | | |
|---|---|---|
| JP | 2004-211661 | 7/2004 |
| WO | 00/50152 A | 8/2000 |

OTHER PUBLICATIONS

Patent Cooperation Treaty, Aug. 31, 2000, pp. 1-56.
English translation of DE 103 47 103 A1.

* cited by examiner

AIR CLEANER FOR VEHICLE AND MOTORCYCLE EQUIPPED WITH THE SAME

This application claims priority under 35 U.S.C. §119 to Japanese Patent Application No. 2007-259647 filed on Oct. 3, 2007, the entire disclosure of which is incorporated herein by reference in its entirety.

BACKGROUND OF THE INVENTION

1. Field of the Invention

The preferred embodiments of the present invention relate, inter alia, to an air cleaner for a vehicle, such as, e.g., a motorcycle, and a motorcycle equipped with the air cleaner.

2. Description of the Related Art

The following description sets forth the inventor's knowledge of related art and problems therein and should not be construed as an admission of knowledge in the prior art.

Vehicles, such as, e.g., motorcycles, are generally equipped with an air cleaner for purifying air to be supplied to an engine (see, e.g., Japanese Unexamined Laid-open Patent Publication No. 2004-211661, hereinafter referred to as "Patent Document 1"). The air cleaner includes an air cleaner case and an air filter element disposed in the air cleaner case. The air cleaner case is provided with an inlet for introducing air and an outlet for releasing air. The air filter element is arranged between the inlet and the outlet. An intake pipe for introducing air to an engine is connected to the outlet.

In the air cleaner disclosed in Patent Document 1, the outlet is positioned above the air filter element. An intake opening of the intake pipe opens obliquely downward at a position above the air filter element inside the air cleaner case.

When an air cleaner is used for a long period of time, its air filter element becomes clogged with grit and dust (hereinafter simply referred to as "dust" or "foreign matters"), which deteriorates purification performance. This requires maintenance, such as, e.g., cleaning or replacement, of the air filter element.

For the maintenance of the air cleaner, the air filter element is required to be detached. During detachment of the air filter element, foreign matters attached to the air filter element may fall into the air cleaner case.

As described above, in the air cleaner disclosed in Patent Document 1, the intake opening of the intake pipe faces obliquely downward at a position above the air filter element. Therefore, even if foreign matters fall during the maintenance, the foreign matters do not enter into the intake pipe.

In some vehicles, however, it is preferable to arrange the intake pipe such that the intake opening faces upward or obliquely upward at a position below the air filter element. Such a structure, however, may cause falling of foreign matters attached to the air filter element into the intake pipe during the maintenance of the air cleaner. As a result, the foreign matters that fell in the intake pipe may cause, e.g., shortened engine life.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an air cleaner for a vehicle capable of preventing foreign matters attached to an air filter element from entering into an intake pipe connected to the air cleaner during the maintenance even in cases where an intake opening of the intake pipe faces upward or obliquely upward at a position below the air filter element.

Among other potential advantages, some embodiments can provide a motorcycle equipped with the aforementioned air cleaner.

According to a first aspect of a preferred embodiment of the present invention, an air cleaner for a vehicle includes an air cleaner case provided with an inlet and an outlet, wherein an intake pipe having an intake opening opened upward or obliquely upward toward an inner space of the air cleaner case is connected to the outlet. The air cleaner further includes a main air filter element provided in the air cleaner case so as to be positioned above the intake opening, and an auxiliary air filter element separated from the main air filter element, the auxiliary air filter element being provided in the air cleaner case so as to be positioned above the intake opening but below the main air filter element. The main air filter element is detachable from the air cleaner case with the auxiliary air filter element fixed to the air cleaner case.

In this air cleaner, it includes the main air filter element and the auxiliary air filter element separated from the main air filter element and positioned above the intake opening but below the main air filter element and that the main air filter element is configured to be detachable from the air cleaner case with the auxiliary air filter element fixed in the air cleaner case. Therefore, even if foreign matters attached to the main air filter element fall off when the main air filter element is detached for maintenance, the foreign matters are captured by the auxiliary air filter element. Thus, it is possible to prevent foreign matters from falling into the intake pipe through the intake opening during the maintenance. Therefore, according to the air cleaner described above, the maintenance work can be facilitated.

According to a second aspect of the preferred embodiment of the present invention, a motorcycle is equipped with the aforementioned air cleaner for a vehicle.

In this motorcycle, even in a case in which the intake opening of the intake pipe opens upward or obliquely upward at a position below the air filter element, it is possible to prevent foreign matters from entering into the intake pipe even if the foreign matters fall from the air filter element during the maintenance of the air cleaner The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Preferred embodiments of the present invention will be described in detail hereinafter with reference to the drawings.

First Embodiment a. General Structure of Motorcycle

Figure 1:
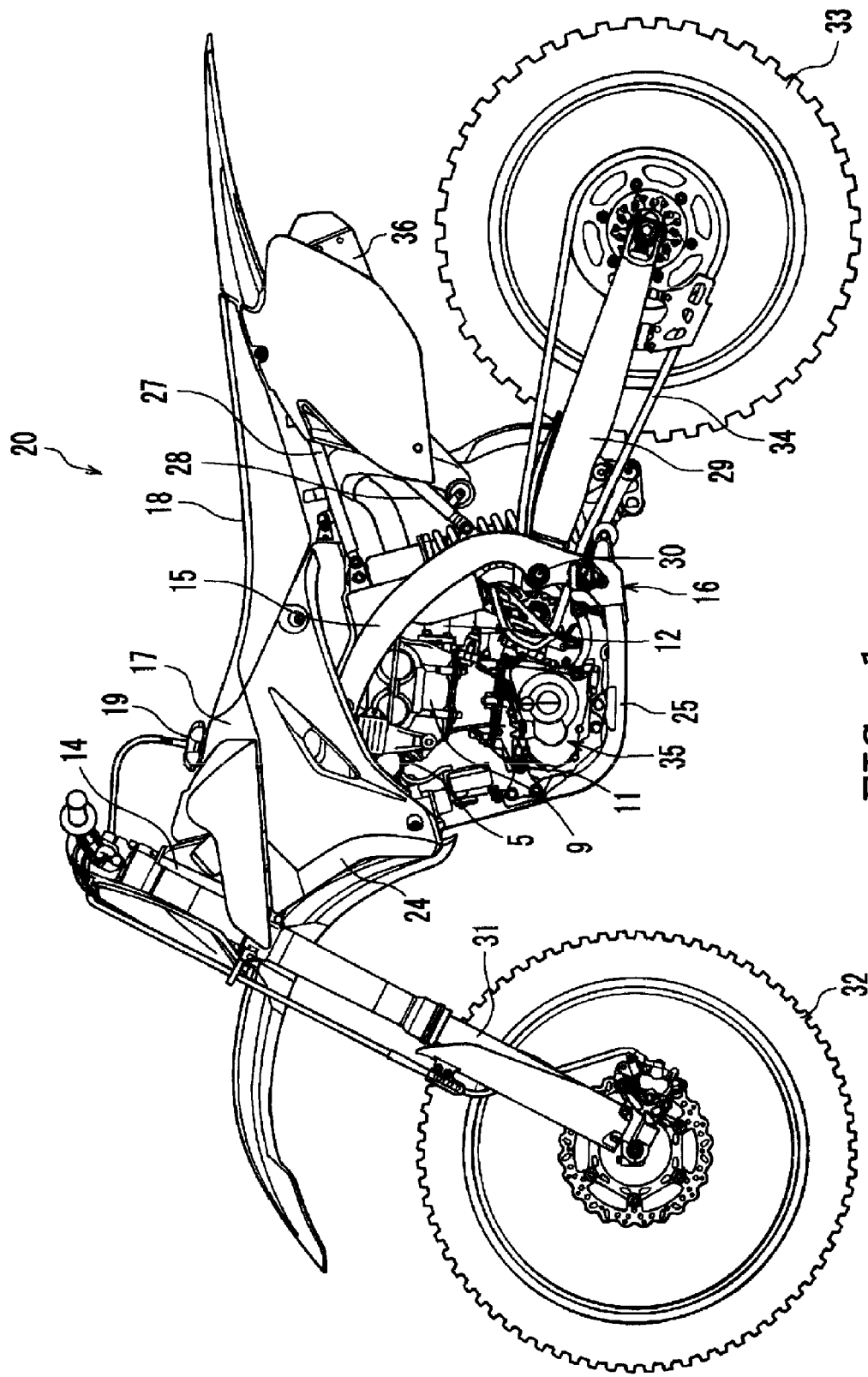
FIG. 1 is a side view of a motorcycle according to a first embodiment of the present invention.

FIG. 1 is a left side view of a motorcycle 20 according to this embodiment. With reference to FIG. 1, a general structure of the motorcycle 20 will be described. In the following description, front, rear, left and right directions are those as viewed from a rider seated on a seat 18.

The motorcycle 20 includes a body frame 16 forming a framework and a seat 18 on which a rider is to be seated. This motorcycle 20 is the so-called off-road type motorcycle. A motorcycle according to the present invention, however, is not limited to this type, but can be a motorcycle other than an off-road type (such as, e.g., motorcycle type, scooter type, or so-called moped type motorcycle).

Figure 2:
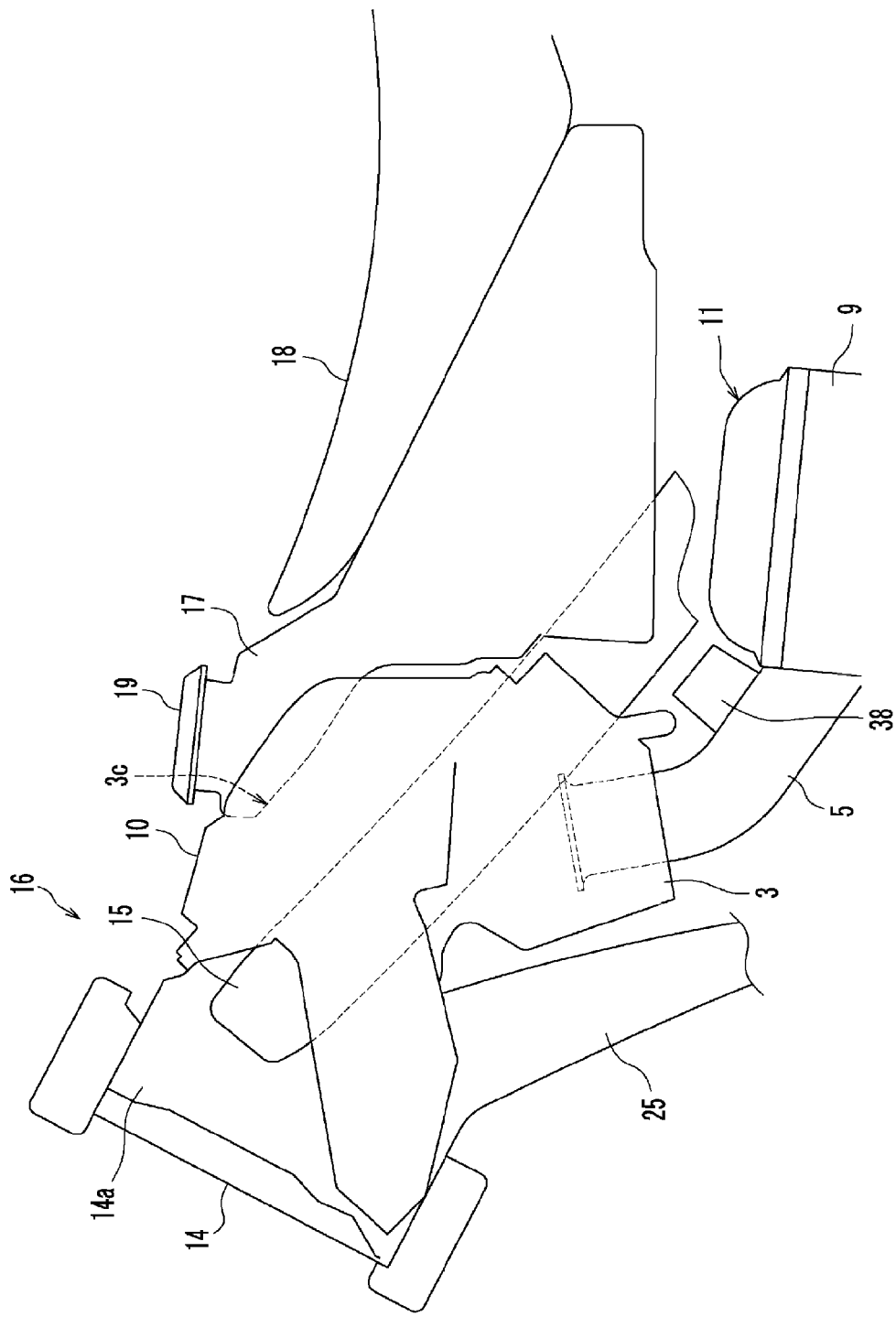
FIG. 2 is an enlarged side view of an air cleaner and the vicinity thereof according to the first embodiment.

The body frame 16 includes a head pipe 14, a down tube 25, and a main frame 15. As shown in FIG. 2, the down tube 25 extends downward from a bracket 14a of the head pipe 14. On the other hand, the main frame 15 extends rearward from the bracket 14a of the head pipe 14 at a position above the down tube 25. The main frame 15 includes a pair of right and left right frame members 15R and 15L (see FIG. 4) that extend rearward from the bracket 14a of the head pipe 14. As shown in FIG. 1, the main frame 15 curves more downward at its rear position.

As shown in FIG. 1, a pair of left and right seat rails 27 is connected to the main frame 15 in a rearward extended manner. A back stay 28 is connected to the main frame 15 at a position below a part of the main frame 15 to which the seat rail 27 is connected. Further, rear arms 29 are each pivotally coupled to the lower end of the main frame 15 with a pivot shaft 30 therebetween.

The head pipe 14 is supported by a front fork 31. A front wheel 32 is supported at the lower end of the front fork 31. A rear wheel 33 is supported by the rear ends of the rear arms 29. A cover 24 for covering the body frame 16 is provided above the body frame 16. Further, a fuel tank 17 extends between the main frame 15 and the back stay 28 above thereof. The seat 18 is disposed above the fuel tank 17. Specifically, as shown in FIG. 2, a front portion of the seat 18 including at least its front end is positioned on the fuel tank 17. The front portion of the seat 18 including at least its front end is disposed to overlap a rear potion of the fuel tank 17 including at least its rear end as viewed from the top.

As shown in FIG. 1, a power unit 35 is disposed between the down tube 25 and the main frame 15 and attached thereto. The power unit 35 is integrally constituted by an engine 15 for generating driving force, a transmission, and so forth. The power unit 35 is connected to the rear wheel 33 via a power transmission means 34, such as, e.g., a chain, to drive the rear wheel 33. With this structure, the driving force generated by the engine 11 is transmitted to the rear wheel 33 through the power transmission means 34.

The engine 11 has a cylinder 9. The cylinder 9 extends obliquely upward rearward in the side view. The cylinder 9 can be disposed so as to extend straight upward in the side view. Alternatively, the cylinder 9 can be disposed so as to extend obliquely upward forward in the side view. In this embodiment, the engine 11 is a four-cycle single-cylinder engine, but can be a two-cycle engine or a multicylinder engine.

As shown in FIG. 2, the cylinder 9 is connected to one end of an intake pipe 5. The intake pipe 5 extends obliquely upward from the cylinder 9 in the side view. The intake pipe 5 extends obliquely forward from the front side of the cylinder 9 in the side view. The other end of the intake pipe 5 is communicated with an air cleaner case 3 of an air cleaner 10. As described in detail later, the air cleaner 10 is configured to purify the air to be supplied to the engine 11 by passing air therethrough. Please note that the intake pipe 5 can extend generally horizontally forward from the front side of the cylinder 9. Reference numeral "38" denotes a fuel injection device, or a carburetor, disposed in the midway of the intake pipe 5 for supplying fuel into the intake pipe 5.

Returning to FIG. 1, one end of an exhaust pipe 12 is connected to the cylinder 9. The exhaust pipe 12 extends obliquely rearward from the rear side of the cylinder 9 in the side view. The other end of the exhaust pipe 12 is connected to a muffler 36. The exhaust pipe 12 can extend generally horizontally rearward from the rear side of the cylinder 9.

The above is a general structure of the motorcycle 20. Next, the structure of the air cleaner 10 according to the present invention will be described in detail.

b. Structure of Air Cleaner

Figure 3:
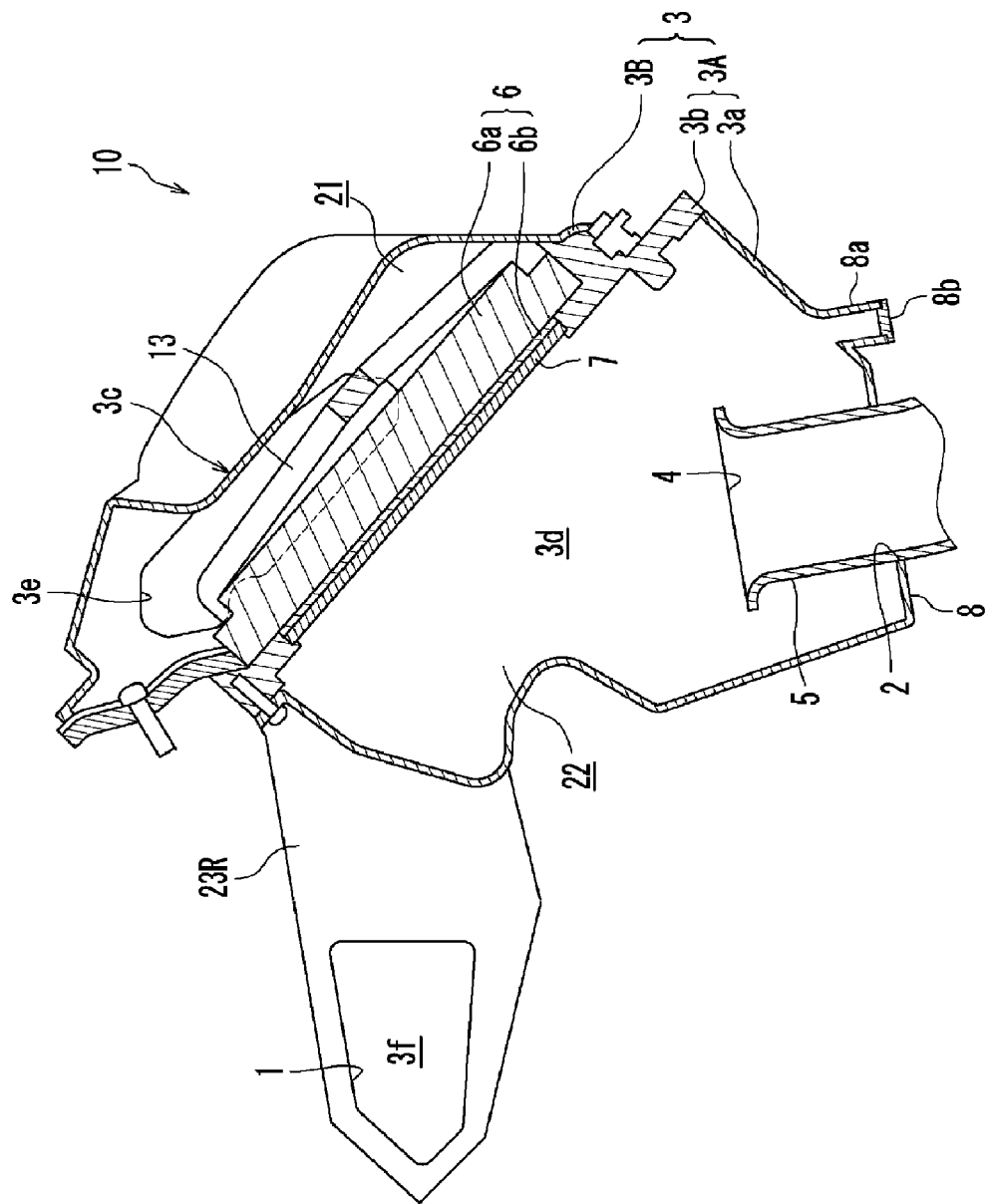
FIG. 3 is a side cross-sectional view of the air cleaner of the first embodiment as viewed from the left side thereof.
Figure 4:
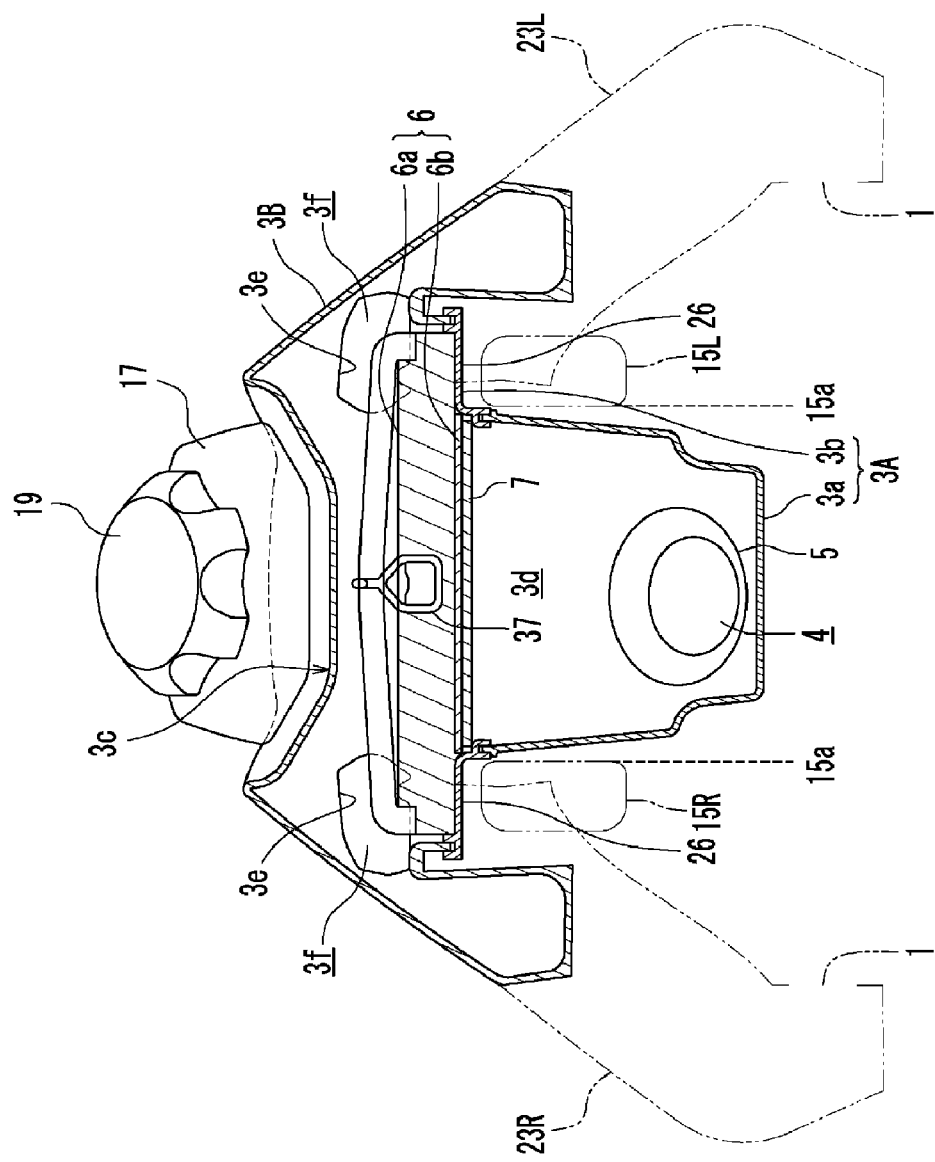
FIG. 4 is a cross-sectional view of the air cleaner of the first embodiment as viewed from the front side thereof.

FIG. 3 is a cross-sectional view of the air cleaner 10 as viewed from the left side. FIG. 4 is a cross-sectional view of the air cleaner 10 as viewed from the front side. As shown in these figures, the air cleaner 10 has an air cleaner case 3 and an air filter element 6 disposed inside the air cleaner case 3. The air cleaner case 3 includes a first case member 3A, a second case member 3B, and two ducts 23R and 23L.

As shown in FIG. 4, the first case member 3A includes a lower section 3a and an upper section 3b. At least a part of the lower section 3a is interposed between the right and left frame members 15R and 15L. In this embodiment, a part of the upper portion of the lower section 3a is interposed between the right and left frame members 15R and 15L. On the other hand, the upper section 3b protrudes above the right and left frame members 15R and 15L from the lower section 3a and extends outward in a lateral direction. The upper section 3b has a seal section 26 for supporting a main air filter element 6a by being brought into contact therewith, which will be described later. The seal section 26 is positioned above the right and left frame members 15R and 15L and at least a part of the seal section 26 is positioned outward of the inner ends 15a of the right and left frame members 15R and 15L in the lateral direction.

The second case member 3B covers the first case member 3A from the above and is detachably attached to the first case member 3A. The first case member 3A and the second case member 3B form an inner space 3d for temporarily reserving air and passing it toward the intake pipe 5 in the air cleaner case 3.

The second case member 3B is provided with two openings 3e. The openings 3e are formed at positions generally symmetrically in the lateral direction. Ducts 23R and 23L are attached to the respective openings 3e. The duct 23L disposed at the left side and the duct 23R disposed at the right side are formed into generally symmetrical shapes. The ducts 23R and 23L respectively extend laterally outward from the second case member 3B and then curve to further extend forward (see FIG. 5). Inlets 1 for introducing the outside air into the ducts 23R and 23L are respectively formed at the front ends of the two ducts 23R and 23L. Inflow passages 3f for introducing the outside air into the inner space 3d are respectively formed in the two ducts 23R and 23L. The two openings 3e are not required to be formed at generally symmetrical positions in the lateral direction. Also, the ducts 23R and 23L are not always required to be formed into generally symmetrical shapes in the lateral direction.

The ducts 23R and 23L are connected to the second case member 3B in such a manner that when the inflow passages 3f are extended toward the inner space 3d side and the inflow passages 3f do not intersect with an upper surface of the air filter element 6. In other words, the ducts 23R and 23L are connected to the second case member 3B in such a manner that, when the inflow passages 3f are extended toward the inner space 3d side, the extended portions of the inflow passages 3f extend above the upper surface of the air filter element 6.

As shown in FIG. 3, the lower section 3a of the first case member 3A forming a part of the inner space 3d has a bottom plate 8. The bottom plate 8 is provided with an outlet 2 for ejecting air out of the inner space 3d. Connected to the outlet 2 is the intake pipe 5. The intake pipe 5 is provided with an intake opening 4 opened obliquely upward in the inner space 3d. The intake opening 4 can open upward. The intake pipe 5 extends above the bottom plate 8 in the inner space 3d. Thus, the intake opening 4 is positioned above the bottom plate 8. The intake pipe 5 can be connected to the bottom plate 8 of the air cleaner case 3 so that the intake opening 4 is generally flush with the bottom plate 8 of the air cleaner case 3. In this case, the intake opening 4 opens upward or obliquely upward toward the inner space 3d.

The bottom plate 8 is provided with a drainage section 8a for discharging water accumulated on the bottom plate 8 due to bad-weather driving, e.g., rain driving. In this embodiment, the drainage section 8a is closed by a lid 8b. With this lid 8b, dust is prevented from entering through the drainage section 8a into the clean-side chamber 22, which will be described later. The drainage section 8a can be closed by a sponge or the like instead of the lid 8b. Alternatively, the drainage section 8a can be provided with a backflow prevention device without providing the lid 8b.

As shown in FIG. 2, at least a part of the air cleaner case 3 is disposed below the fuel tank 17. More specifically, a part of the rear side of the air cleaner case 3 is positioned below a part of the front side of the fuel tank 17. As shown in FIGS. 2 and 4, at least a portion 3c of the air cleaner case 3, which is the part positioned below the fuel tank 17, is dented downward. Accordingly, at least a part of the fuel tank 17 is positioned over the downwardly dented portion 3c of the air cleaner case 3. As shown in FIG. 2, the fuel tank 17 is provided with a cap 19 to cover a filler opening (not shown) opened upward. The cap 19 is positioned above the downwardly dented portion 3c of the air cleaner case 3.

As shown in FIG. 3, in this embodiment, the air filter element 6 is formed into a plate shape. The air filter element 6 includes a main air filter element 6a and an auxiliary air filter element 6b separated from the main air filter element 6a. Both the main air filter element 6a and the auxiliary air filter element 6b are disposed in the inner space 3d. The air filter element 6 divides the inner space 3d, which is at least a part of the inside of the air cleaner case 3, into upper and lower spaces. More specifically, the air filter element 6 divides the inner space 3d into a dirty-side chamber 21 positioned above the main air filter element 6a and the clean-side chamber 22 positioned below the auxiliary air filter element 6b.

The main air filter element 6a is disposed above the intake opening 4. The main air filter element 6a is supported by the seal section 26 of the upper section 3b of the first case member 3A and thereby sealed around its circumference. On the other hand, the auxiliary air filter element 6b is attached to the upper section 3b so as to be positioned above the intake opening 4 but below the main air filter element 6a. In this embodiment, the main air filter element 6a is configured such that the main air filter element 6a can be detached from the upper section 3b with the auxiliary air filter element 6b attached to the upper section 3b. In other words, the main air filter element 6a is configured to be detachable from the upper section 3b in a state in which the auxiliary air filter element 6b is attached in the inner space 3d.

The main air filter element 6a is constituted by an air filter element finer than the auxiliary air filter element 6b. In other words, the auxiliary air filter element 6b has a fineness coarser than that of the main air filter element 6a. However, the main air filter element 6a and the auxiliary air filter element 6b can have the same fineness. Further, the main air filter element 6a can have a fineness coarser than that of the auxiliary air filter element 6b.

Figure 5:
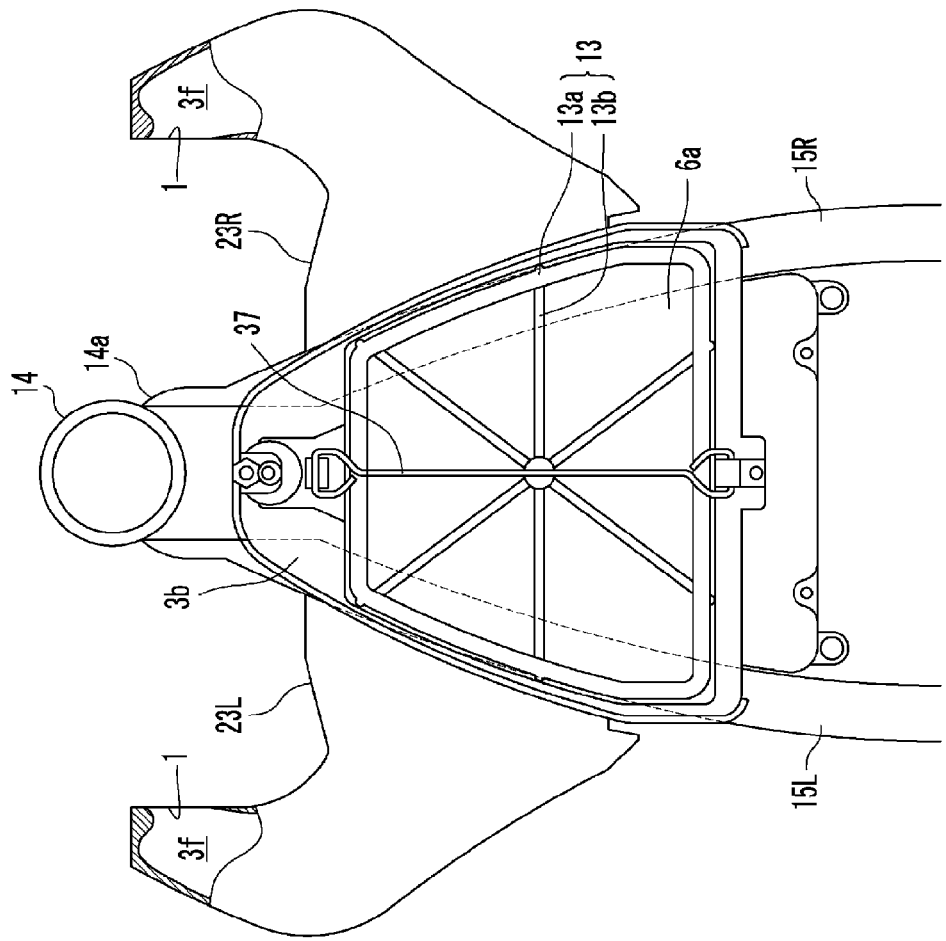
FIG. 5 is a top view of the air cleaner of the first embodiment and the vicinity thereof as viewed from above in a state in which a second case member of the air cleaner is detached.

A pressing member 13 is disposed above the main air filter element 6a. The pressing member 13 is configured to press the main air filter element 6a downward or obliquely downward. In this embodiment, as shown in FIG. 5, the pressing member 13 includes a frame 13a having a generally trapezoidal shape and six ribs 13b radially extending from the center of the frame 13a. Also, in this embodiment, the pressing member 13 is fixed by a detachable fixing member 37. In FIG. 3, the fixing member 37 is not shown.

Further as shown in FIG. 3, in this embodiment, a flameproof net 7 is disposed under the auxiliary air filter element 6b. The flameproof net 7 extinguishes flames caused by a backfire ("backfire" is a phenomenon in which mixture gas to be combusted in the cylinder 9 causes back flow of flames to the intake pipe 5, etc.) from the engine 11 and thereby prevents the air filter element 6 from being burned by the flames.

With the above construction, the outside air taken from the inlets 1 into the ducts 23R and 23L is introduced into the upper portion (dirty-side chamber 21) in the inner space 3d through the inflow passages 3f. The air further flows from the upper portion to the lower portion (from the dirty-side chamber 21 to the clean-side chamber 22) in the inner space 3d. At this time, the air passes through the main air filter element 6a and the auxiliary air filter element 6b. Dust in the air is captured by the main air filter element 6a as the air passes through the main air filter element 6a. As a result, the air is purified. In this embodiment, the auxiliary air filter element 6b has a fineness coarser than that of the main air filter element 6a. Therefore, dust is mostly captured by the main air filter element 6a but hardly captured by the auxiliary air filter element 6b. Thus, the air passed through the air filter element 6 flows into the intake pipe 5 through the intake opening 4. The air is then supplied to the cylinder 9 in the engine 11 through the intake pipe 5.

Next, the maintenance work (replacement, washing or cleaning) of the air filter element 6, which is one of maintenance works of the air cleaner 10, will be described.

Generally, under normal use, an air filter element of the air cleaner becomes clogged with captured dust, and becomes dirty to reduce its purification performance. This requires regular maintenance, such as, e.g., replacement, washing or cleaning, of the air filter element. In the air cleaner 10 according to this embodiment, the air filter element 6 includes the main air filter element 6a and the auxiliary air filter element 6b having a fineness coarser than that of the main air filter element 6a. Accordingly, dust having a size capable of being captured by the auxiliary air filter element 6b is mostly captured by the main air filter element 6a. As a result, the auxiliary air filter element 6b has less dirt. Therefore, it is possible in the air cleaner 10 to recover the reduced purification performance by replacing, washing or cleaning only the main air filter element 6a when the air filter element 6 is subjected to replacement, washing or cleaning. The maintenance work (replacement, washing or cleaning) of the main air filter element 6a will be described below.

First, the second case member 3B is detached from the first case member 3A. After detaching the second case member 3B, the fixing member 37 for fixing the pressing member 13 is disengaged to detach the pressing member 13. Next, the main air filter element 6a is detached from the seal section 26 of the upper section 3b of the first case member 3A. It should be noted that the main air filter element 6a is placed on the seal section 26. Accordingly, the main air filter element 6a can be detached with a simple work of lifting the main air filter element 6a. The main air filter element 6a is configured to be detachable from the upper section 3b of the first case member 3A with the auxiliary air filter element 6b fixed in the inner space 3d. Accordingly, the auxiliary air filter element 6b remains fixed in the inner space 3d after detaching the main air filter element 6a.

As described above, in the state in which the auxiliary air filter element 6b remains fixed in the inner space 3d, a replacing main air filter element 6a is then placed on the seal section 26 of the upper section 3b. Alternatively, after washing or cleaning the detached main air filter element 6a, the washed or cleaned main air filter element 6a is replaced on the seal section 26 of the upper section 3b. Following the reverse procedure of the procedure described above, the pressing member 13 and the fixing member 37 are attached. Finally, the second case member 3B to which the ducts 23R and 23L are attached is assembled so as to cover the first case member 3A from the above. With the aforementioned work, it is possible to recover the purification performance of the air filter element 6 by replacing, washing or cleaning the main air filter element 6a. Thus, the maintenance work of the air cleaner 10 is completed.

As described above, in the air cleaner 10 for a vehicle according to this embodiment, the main air filter element 6a and the auxiliary air filter element 6b separated from the main air filter element 6a are provided. The main air filter element 6a is configured to be detachable from the air cleaner case 3 with the auxiliary air filter element 6b fixed in the air cleaner case 3. Therefore, according to the air cleaner 10, even if foreign matters attached to the main air filter element 6a fall off when the main air filter element 6a is detached for maintenance, the foreign matters are captured by the auxiliary air filter element 6b. Therefore, in the motorcycle 20 in which the intake opening 4 of the intake pipe 5 opens upward or obliquely upward at a position below the main air filter element 6a, it is possible to prevent foreign matters from falling into the intake pipe 5 through the intake opening 4 during the maintenance of the main air filter element 6a. As a result, according to the air cleaner 10, the maintenance work can be facilitated even though the intake opening 4 opens upward or obliquely upward in the air cleaner 10.

In this embodiment, the main air filter element 6a of the air cleaner 10 has a fineness finer than that of the auxiliary air filter element 6b. Accordingly, dust having a size capable of being captured by the auxiliary air filter element 6b is mostly captured by the main air filter element 6a. In other words, air purification is mainly performed by the main air filter element 6a. Therefore, the auxiliary air filter element 6b is hardly clogged with dust and the like. Thus, according to the air cleaner 10, maintenance frequencies of the auxiliary air filter element 6b can be reduced. That is, detachment frequencies of the auxiliary air filter element 6b can be decreased. This further reduces the possibility that foreign matters fall into the intake pipe 5.

Incidentally, there is a case that water enters into the main air filter element 6a or the auxiliary air filter element 6b while driving during rain or the like. However, in this motorcycle 20, the intake pipe 5 extends above the bottom plate 8 in the inner space 3d inside the air cleaner case 3. Thus, water flows down along a side face of the air cleaner case 3 to be accumulated on the bottom plate 8 of the air cleaner case 3. As a result, according to the motorcycle 20, it is possible to prevent water from entering into the intake pipe 5 through the intake opening 4 even while driving during rain or the like. Further, according to this air cleaner 10, the drainage section 8a is provided. This allows water collected on the bottom plate 8 of the air cleaner case 3 to be smoothly discharged outside. In addition, in this embodiment, the drainage section 8a is closed by the lid 8b. Therefore, it is possible to prevent dust from being sucked from the drainage section 8a into the clean-side chamber 22, which will be described later.

In the motorcycle 20, the intake pipe 5 extends obliquely upward from the cylinder 9 to the air cleaner case 3. Accordingly, in this motorcycle 20, the intake pipe 5 can have a downdraft configuration with less curvatures. Therefore, according to the motorcycle 20, an intake pipe 5 high in intake efficiency can be obtained.

In the motorcycle 20 according to the embodiment, as viewed from the side, the cylinder 9 extends upward obliquely rearward, the exhaust pipe 12 extends obliquely rearward from the rear side of the cylinder 9, and the intake pipe 5 extends obliquely forward from the front side of the cylinder 9. In such a motorcycle 20, since the layout of the air cleaner 10 and the intake pipe 5 is significantly restricted, the above-mentioned effects can be remarkably achieved. In other words, the air cleaner 10 according to the embodiment is especially suitable for a motorcycle constructed as described above. The same effects can be obtained in such a motorcycle that the cylinder 9 extends upward, the exhaust pipe 12 extends rearward from the rear side of the cylinder 9, and the intake pipe 5 extends forward from the front side of the cylinder 9 in the side view.

The intake pipe 5 can extend forward generally horizontally from the front side of the cylinder 9 and the exhaust pipe 12 can extend rearward generally horizontally from the rear side of the cylinder 9. Even in this case, the same effects as mentioned above can be achieved. Further, the motorcycle according to the present invention is not limited to this. The invention can be applied to a motorcycle in which the intake pipe 5 extends rearward or obliquely rearward from the rear side of the cylinder 9 and the exhaust pipe 12 extends forward or obliquely forward from the front side of the cylinder 9.

The air cleaner 10 according to this embodiment is especially suitable for the off-road motorcycle 20 of this embodiment. Since the off-road motorcycle 20 runs on rough terrain, its air cleaner 10 tends to suck dust and the like. Accordingly, the above effects of the air cleaner 10 can be remarkably achieved on the off-road motorcycle 20.

Further, the motorcycle 20 according to the embodiment is equipped with the pressing member 13 for pressing the main air filter element 6a. Therefore, according to the motorcycle 20, even though the motorcycle 20 runs on rough terrain and is subjected to vibration, the pressing member 13 securely presses the main air filter element 6a. As a result, in the motorcycle 20, the main air filter element 6a can be prevented from dropping off.

Second Embodiment

Figure 6:
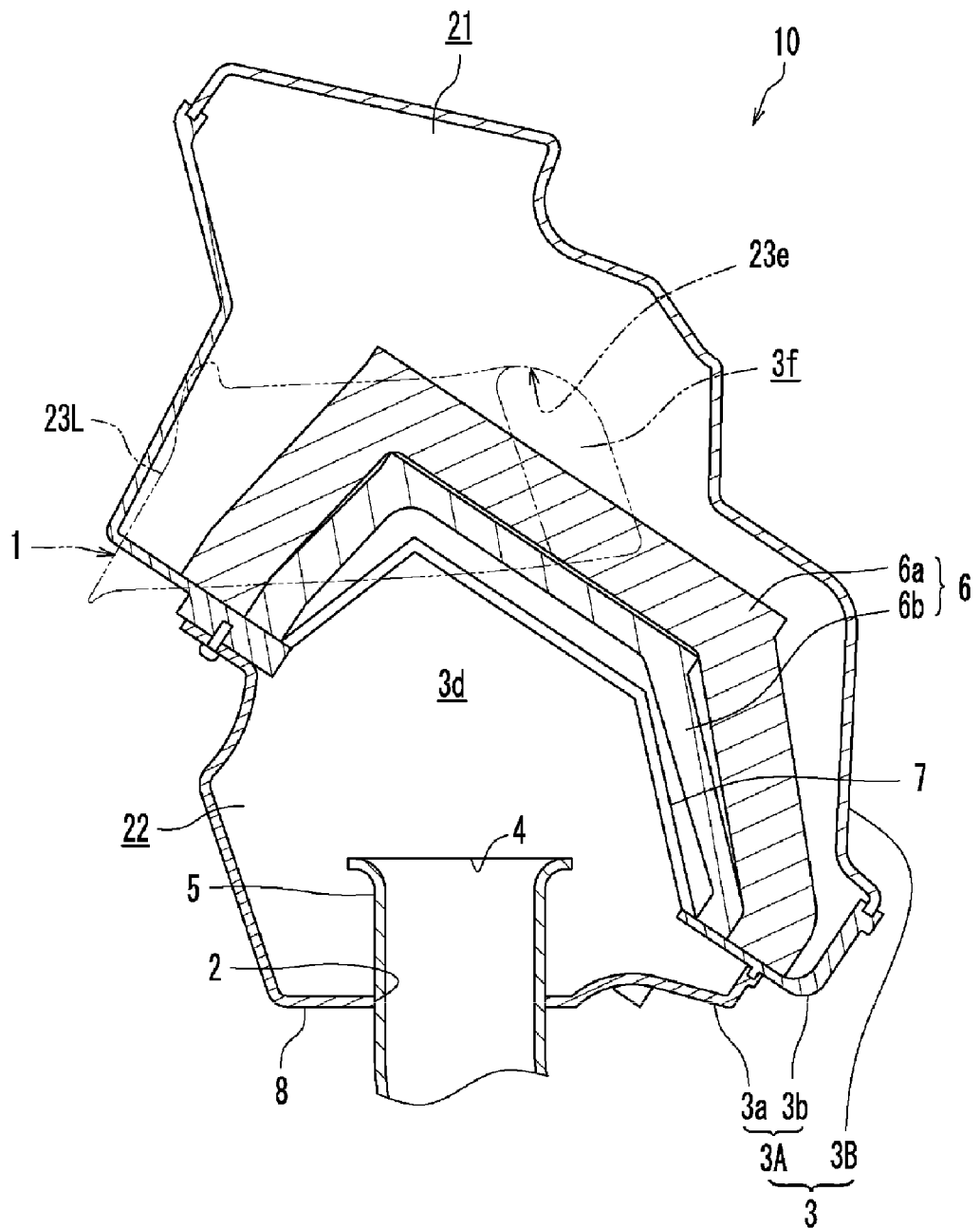
FIG. 6 is a cross-sectional view of an air cleaner according to a second embodiment as viewed from the left side thereof.

As shown in FIG. 6, in a motorcycle 20 according to a second embodiment, an air filter element 6, which is formed in a plate shape in the first embodiment, is formed into a bowl shape or an upwardly protruded shape and an air cleaner case 3 is accordingly deformed to fit this shape. The following description will be mainly directed to the structure of an air cleaner 10 different from the first embodiment.

Figure 7:
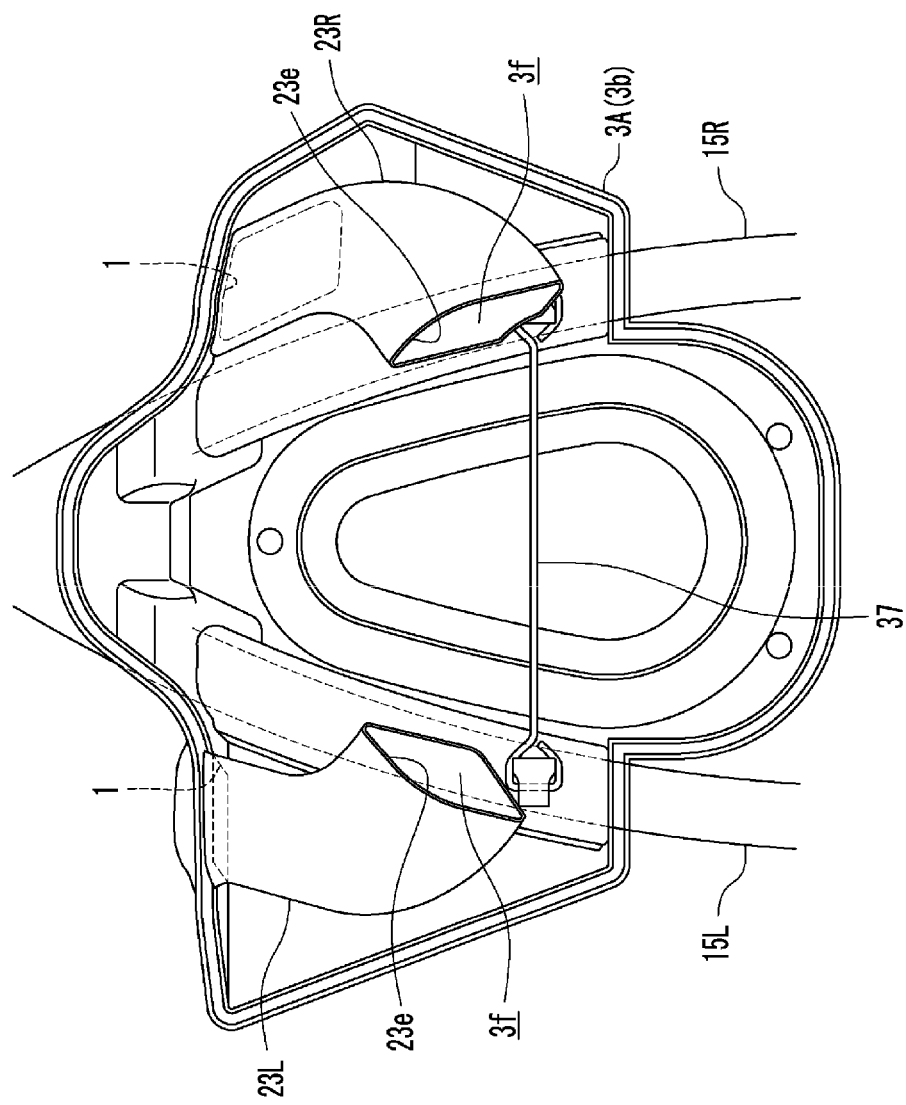
FIG. 7 is a top view of the air cleaner according to the second embodiment and the vicinity thereof as viewed from above in a state in which a second case member of the air cleaner is detached.

FIG. 6 is a cross-sectional view of the air cleaner 10 as viewed from the left side. FIG. 7 is a view of the air cleaner 10 as viewed from the above with its second case member 3B detached. As shown in FIGS. 6 and 7, the air cleaner 10 has an air cleaner case 3 and an air filter element 6 disposed inside the air cleaner case 3. The air filter element 6 is disposed inside the air cleaner case 3. The air cleaner case 3 includes a first case member 3A, a second case member 3B, and two ducts 23R and 23L.

As shown in FIG. 6, the first case member 3A includes a lower section 3a and an upper section 3b. The second case member 3B covers the first case member 3A from the above and is detachably attached to the first case member 3A. The first case member 3A and the second case member 3B form an inner space 3d for temporarily reserving air and passing it toward the intake pipe 5 in the air cleaner case 3.

As shown in FIG. 7, in the upper section 3b of the first case member 3A, the ducts 23R and 23L are formed to fluidly connect the outside and the inner space 3d. The duct 23L disposed at the left side and the duct 23R disposed at the right side are positioned at portions generally symmetrically in the lateral direction. The ducts 23R and 23L respectively penetrate a front face of the upper section 3b from front to rear and extend laterally inward in the inner space 3d to open toward a central direction. At each front end of the two ducts 23R and 23L, an inlet 1 is formed. At each rear end, an opening 23e is formed. Inflow passages 3f for introducing the outside air into the inner space 3d are respectively formed in the two ducts 23R and 23L.

As shown in FIG. 6, the lower section 3a of the first case member 3A forming a part of the inner space 3d has a bottom plate 8. An outlet 2 for ejecting air out of the inner space 3d is formed in the bottom plate 8. The intake pipe 5 for supplying air to the cylinder 9 is connected to the inlet 5. The intake pipe 5 has an intake opening 4 opened upward or obliquely upward in the inner space 3d. The intake pipe 5 extends above the bottom plate 8 in the inner space 3d. Accordingly, the intake opening 4 is positioned above the bottom plate 8. Formed in the bottom plate 8 is a drainage section (not shown) for discharging water accumulated on the bottom plate 8 due to, e.g., rain driving.

In the second embodiment, the air filter element 6 is formed into a bowl shape. Specifically, the air filter element 6 includes a bowl-shaped main air filter element 6a and a bowl-shaped auxiliary air filter element 6b separated from the main air filter element 6a. Both the main air filter element 6a and the auxiliary air filter element 6b are disposed in the inner space 3d. The air filter element 6 divides the inner space 3d, which is at least a part of the inside of the air cleaner case 3, into upper and lower spaces. More specifically, the air filter element 6 divides the inner space 3d into a dirty-side chamber 21 positioned above the main air filter element 6a and a clean-side chamber 22 positioned below the auxiliary air filter element 6b.

The main air filter element 6a is disposed above the intake opening 4 and supported by the upper section 3b of the first case member 3A. The auxiliary air filter element 6b is disposed above the intake opening 4 but below the main air filter element 6a, and supported by the upper section 3b of the first case member 3A. Also, in the second embodiment, the main air filter element 6a is configured to be detachable from the upper section 3b of the first case member 3A with the auxiliary air filter element 6b fixed in the inner space 3d.

Also, in the second embodiment, the main air filter element 6a has a fineness finer than that of the auxiliary air filter element 6b. In other words, the auxiliary air filter element 6b has a fineness coarser than that of the main air filter element 6a. However, the main air filter element 6a and the auxiliary air filter element 6b can have the same fineness. Further, the main air filter element 6a can have a fineness coarser than that of the auxiliary air filter element 6b.

Also, in the second embodiment, a flameproof net 7 is disposed below the auxiliary air filter element 6b.

As shown FIG. 7, in the second embodiment, a detachable fixing member 37 is provided above the main air filter element 6a. In the second embodiment, the main air filter element 6a is pressed downward by the fixing member 37. In FIG. 6, the fixing member 37 is not shown.

In the second embodiment also, with the above structure, the outside air taken from the inlets 1 into the ducts 23R and 23L is introduced into an upper portion (dirty-side chamber 21) in the inner space 3d through the inflow passages 3f. The air further flows from top to bottom (i.e., from the dirty-side chamber 21 to the clean-side chamber 22) in the inner space 3d. At this time, the air passes through the main air filter element 6a and then the auxiliary air filter element 6b. Dust and the like in the air are captured by the main air filter element 6a as the air passes through the main air filter element 6a. As a result, the air is purified. Also, in the second embodiment, the auxiliary air filter element 6b has a fineness coarser than that of the main air filter element 6a. Therefore, dust and the like are mostly captured by the main air filter element 6a but hardly captured by the auxiliary air filter element 6b. Thus, the air passed through the air filter element 6 flows into the intake pipe 5 through the intake opening 4. The air is then supplied to the cylinder 9 in the engine 11 through the intake pipe 5.

As described above, also in the air cleaner 10 according to the second embodiment, the main air filter element 6a and the auxiliary air filter element 6b separated from the main air filter element 6a are provided. The main air filter element 6a is configured to be detachable from the air cleaner case 3 with the auxiliary air filter element 6b fixed in the air cleaner case 3. Therefore, according to the air cleaner 10, even if foreign matters attached to the main air filter element 6a fall off when the main air filter element 6a is detached for maintenance, the foreign matters are captured by the auxiliary air filter element 6b. Thus, it is possible to prevent foreign matters from falling into the intake pipe 5 through the intake opening 4 during the maintenance. As a result, according to the air cleaner 10, the maintenance work can be facilitated even though the intake opening 4 opens upward or obliquely upward in the air cleaner 10.

In addition, the air filter element 6 of the air cleaner 10 according to the second embodiment is formed into a bowl shape. Accordingly, the surface area of the air filter element 6 can be increased. Therefore, according to the air cleaner 10, a period of maintenance of the air filter element 6 can be extended. Extension of the period of maintenance reduces detachment frequencies of the air filter element 6. This further reduces the possibility that foreign matters fall into the intake pipe 5.

In the second embodiment, the main air filter element 6a, the auxiliary air filter element 6b and the flameproof net 7 are each formed into a bowl shape. However, only the main air filter element 6a can be formed into a bowl shape. The main air filter element 6a has a fineness finer than the auxiliary air filter element 6b. Accordingly, dust having a size capable of being captured by the auxiliary air filter element 6b is mostly captured by the main air filter element 6a. In other words, air purification is mainly performed by the main air filter element 6a. Thus, even if only the main air filter element 6a is formed into a bowl shape, the surface area of the main air filter element 6a for purifying air can be increased. Accordingly, a period of maintenance of the air filter element 6 can be extended. This reduces detachment frequencies of the main air filter element 6a, thereby achieving the effects similar to those described above in which the possibility of the foreign matters falling into the intake pipe 5 can be further reduced.

Third Embodiment

Figure 8:
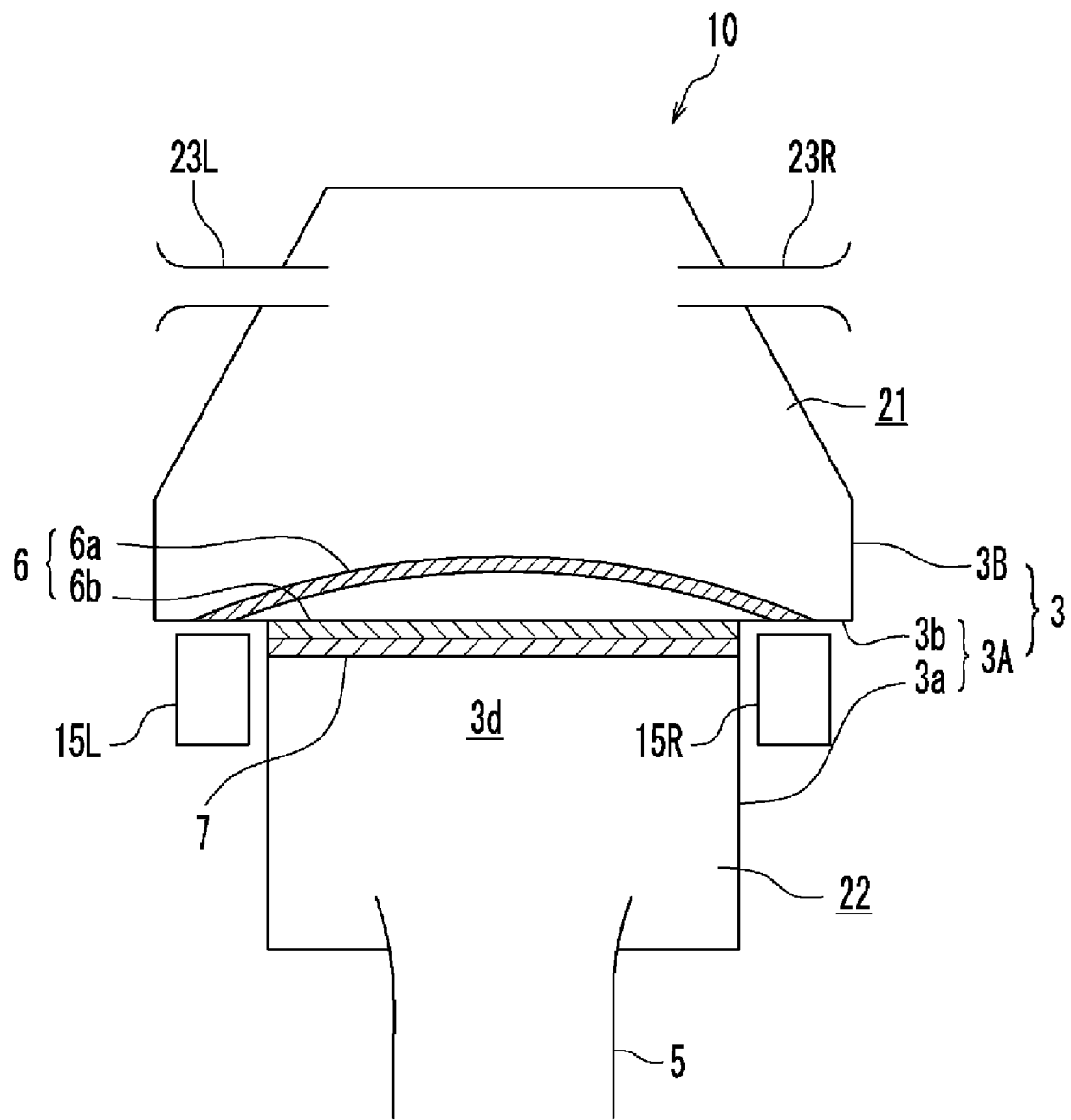
FIG. 8 is a schematic view of an air cleaner according to a third embodiment.

FIG. 8 is a cross-sectional view schematically showing an air cleaner 10 according to a third embodiment. As shown in FIG. 8, in the third embodiment, the main air filter element 6a, which is formed into a flat plate shape in the first embodiment, is formed into a curved plate shape. Other structure other than the above is similar to the first embodiment and therefore the description thereof will be omitted.

As described above, in the air cleaner 10 according to the third embodiment, the main air filter element 6a is formed into a curved plate shape. Accordingly, the surface area of the air filter element 6a can be increased. Also, in the third embodiment, the main air filter element 6a has a fineness finer than that of the auxiliary air filter element 6b. Accordingly, dust having a size capable of being captured by the auxiliary air filter element 6b is mostly captured by the main air filter element 6a. In other words, air purification is mainly performed by the main air filter element 6a. Therefore, even if only the main air filter element 6a is formed into a curved plate shape while the auxiliary air filter element 6b is formed into a flat plate shape, the surface area of the main air filter element 6a which mainly performs air purification increases, resulting in an extended period of maintenance of the air filter element 6. This reduces detachment frequencies of the main air filter element 6a, thereby reducing the possibility of the foreign matters falling into the intake pipe 5.

In the third embodiment, only the main air filter element 6a is formed into a curved plate shape. However, it is a matter of course that either one of or both of the auxiliary air filter element 6b and the flameproof net 7 can be formed into a curved plate shape.

Also, in the third embodiment, the main air filter element 6a and the auxiliary air filter element 6b can have the same fineness. Further, the main air filter element 6a can have a fineness coarser than that of the auxiliary air filter element 6b.

Figure 9A:
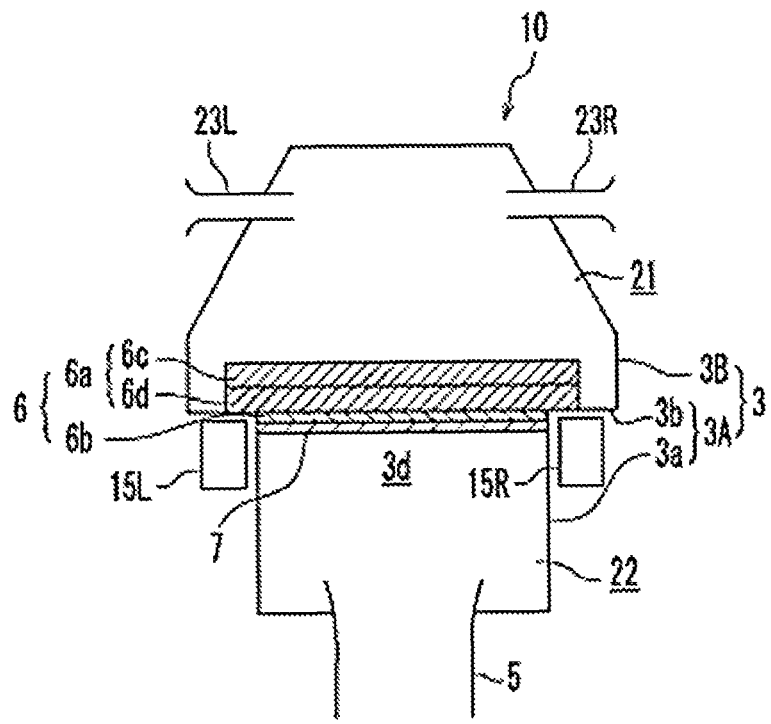
FIGS. 9A and 9B are schematic views of air cleaners according to modifications of the disclosed embodiments.
Figure 9B:
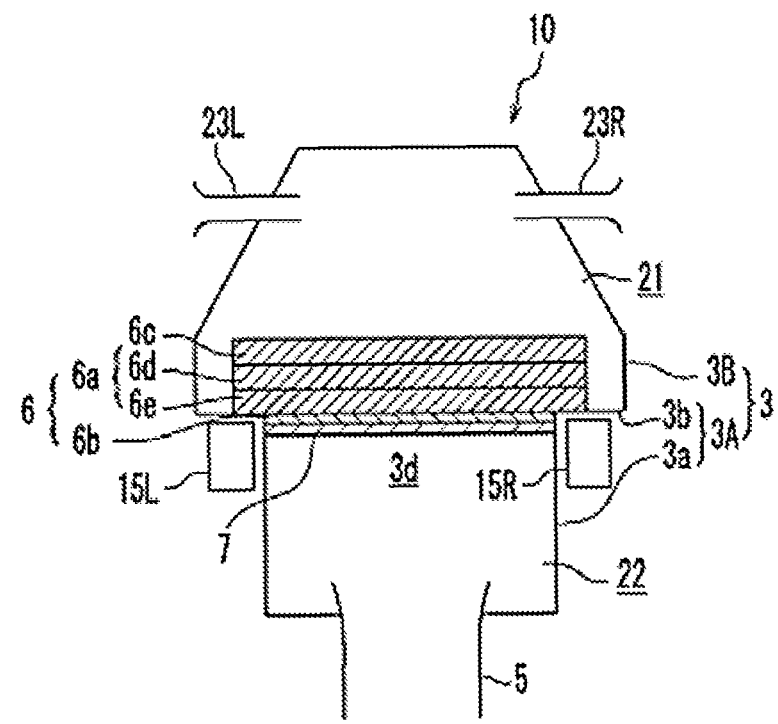

In each of embodiments described above, the main air filter element 6a is constituted by a single air filter element member (single-layered configuration). However, the main air filter element 6a can be multi-layered. Specifically, as shown in FIG. 9A, the main air filter element 6a can be double-layered in which a first air filter element 6c and a second air filter element 6d having a fineness finer than that of the first air filter element 6c are provided. As shown in FIG. 9B, the main air filter element 6a can be triple-layered in which a first air filter element 6c, a second air filter element 6d having a fineness finer than that of the first air filter element 6c and a third air filter element 6e having a fineness finer than that of the second air filter element 6d are provided. Further, the main air filter element 6a can have more layers. As described above, the air filter element can be configured such that a plurality of air filter elements are layered so that a downstream side air filter element has a finer air filter element. This improves air purification performance. In the multi-layered configuration described above, it is preferable that air filter elements constituting the respective layers can be integrally replaced.

INDUSTRIAL APPLICABILITY

As described above, the present invention is preferably applied to an air cleaner for a vehicle, such as, e.g., a motorcycle, especially the so-called off-road type motorcycle, and a motorcycle having the air cleaner.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a)

"means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An air cleaner for a vehicle, comprising:
an air cleaner case provided with an inlet and an outlet, wherein an intake pipe having an intake opening is connected to the outlet so that the intake opening opens upward or obliquely upward toward an inner space of the air cleaner case;
a main air filter element provided in the air cleaner case so as to be positioned above the intake opening; and
an auxiliary air filter element separated from the main air filter element, the auxiliary air filter element being provided in the air cleaner case so as to be positioned above the intake opening but below the main air filter element,
wherein the main air filter element is detachable from the air cleaner case with the auxiliary air filter element fixed to the air cleaner case, and
wherein the main air filter element is finer than the auxiliary air filter element.

2. The air cleaner for a vehicle as recited in claim 1, wherein the main air filter element is formed into a curved plate shape or a bowl shape.

3. The air cleaner for a vehicle as recited in claim 1, further comprising a pressing member for pressing the main air filter element downward or obliquely downward.

4. The air cleaner for a vehicle as recited in claim 1, further comprising a flameproof member positioned below the auxiliary air filter element.

5. The air cleaner for a vehicle as recited in claim 1, wherein: the air cleaner case includes a first case member, a second case member, and at least one duct,
the second case member detachably covers the first case member to form the inner space therebetween,
the at least one duct has an inlet for introducing outside air and an outlet communicated with the second case member for discharging the air into the inner space, and
the main air filter element and the auxiliary air filter element are disposed between the first case member and the second case member so as to divide the inner space into a dirty-side chamber and a clean-side chamber.

6. The air cleaner for a vehicle as recited in claim 5, wherein the first case member has a bottom wall having a drainage section for draining water accumulated in the inner space.

7. The air cleaner for a vehicle as recited in claim 6, wherein the drainage section is provided with a lid for closing an opening of the drainage section.

8. A motorcycle equipped with an air cleaner for a vehicle, the air cleaner comprising:
an air cleaner case provided with an inlet and an outlet, wherein an intake pipe having an intake opening is connected to the outlet so that the intake opening opens upward or obliquely upward toward an inner space of the air cleaner case;
a main air filter element provided in the air cleaner case so as to be positioned above the intake opening; and
an auxiliary air filter element separated from the main air filter element, the auxiliary air filter element being provided in the air cleaner case so as to be positioned above the intake opening but below the main air filter element,
wherein the main air filter element is detachable from the air cleaner case with the auxiliary air filter element fixed to the air cleaner case, and
wherein the main air filter element is finer than the auxiliary air filter element.

9. The motorcycle as recited in to claim 8, wherein the air cleaner case has a bottom plate having the outlet, and wherein the intake pipe extends upward above the bottom plate in the air case cleaner.

10. The motorcycle as recited in claim 8, further comprising an engine having a cylinder,
wherein the intake pipe extends obliquely upward from the cylinder to the air cleaner case.

11. The motorcycle as recited in claim 8, further comprising:
an engine having a cylinder that extends upward or obliquely upward rearward in the side view; and
an exhaust pipe that extends rearward or obliquely rearward from a rear side of the cylinder in the side view,
wherein the intake pipe extends forward or obliquely forward from a front side of the cylinder in the side view.

12. The motorcycle as recited in claim 8, wherein the motorcycle is an off-road type.

13. The motorcycle as recited in claim 8, further comprising a pressing member for pressing the main air filter element.

14. The motorcycle as recited in claim 8, wherein: the air cleaner case includes a first case member, a second case member, and at least one duct,
the second case member detachably covers the first case member to form the inner space therebetween, wherein the at least one duct has an inlet for introducing outside air and an outlet communicated with the second case member for discharging the air into the inner space, and
the main air filter element and the auxiliary air filter element are disposed between the first case member and the second case member so as to divide the inner space into a dirty-side chamber and a clean-side chamber.

15. The motorcycle as recited in claim 14, wherein the first case member has a bottom wall having a drainage section for draining water accumulated in the inner space.

16. The motorcycle as recited in claim 15, wherein the drainage section is provided with a lid for closing an opening of the drainage section.

17. An air cleaner case for use with an air cleaner system for a vehicle, the air cleaner case comprising:
an inlet;
an outlet, wherein an intake pipe having an intake opening is connected to the outlet so that the intake opening opens upward or obliquely upward toward an inner space of the air cleaner case;

a main air filter element provided in the air cleaner case so as to be positioned above the intake opening and detachable from the air cleaner case; and an auxiliary air filter element separated from the main air filter element, the auxiliary air filter element positioned above the intake opening but below the main air filter element and fixed to the air cleaner case, wherein the main air filter element is finer than the auxiliary air filter element.

18. The air cleaner case as recited in claim 17, wherein: the air cleaner case includes a first case member, a second case member, and at least one duct, the second case member detachably covers the first case member to form the inner space therebetween, the at least one duct has an inlet for introducing outside air and an outlet communicated with the second case member for discharging the air into the inner space, and the main air filter element and the auxiliary air filter element are disposed between the first case member and the second case member so as to divide the inner space into a dirty-side chamber and a clean-side chamber.

* * * * *